Aug. 22, 1944.　　　D. M. PHILLIPS　　　2,356,351
SWIVEL CONNECTION
Filed March 16, 1942　　　2 Sheets-Sheet 1
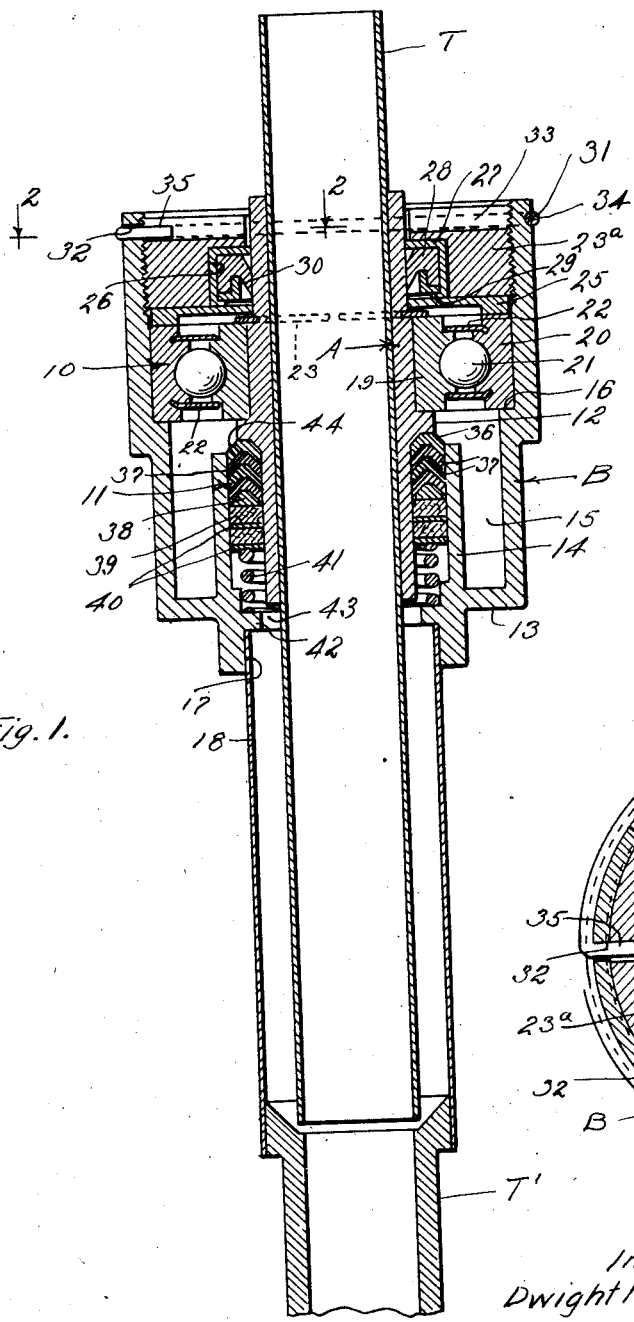
Inventor
Dwight M. Phillips
by
Attorney Aug. 22, 1944.    D. M. PHILLIPS    2,356,351
SWIVEL CONNECTION
Filed March 16, 1942    2 Sheets-Sheet 2
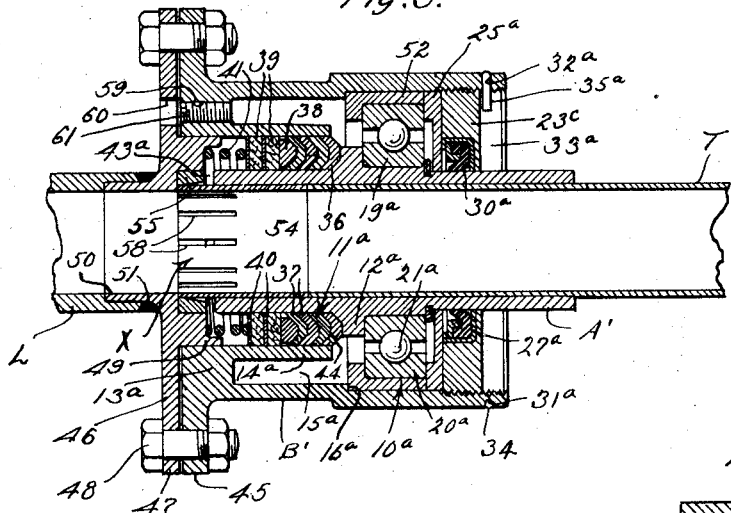
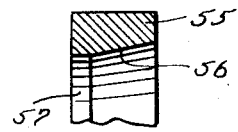
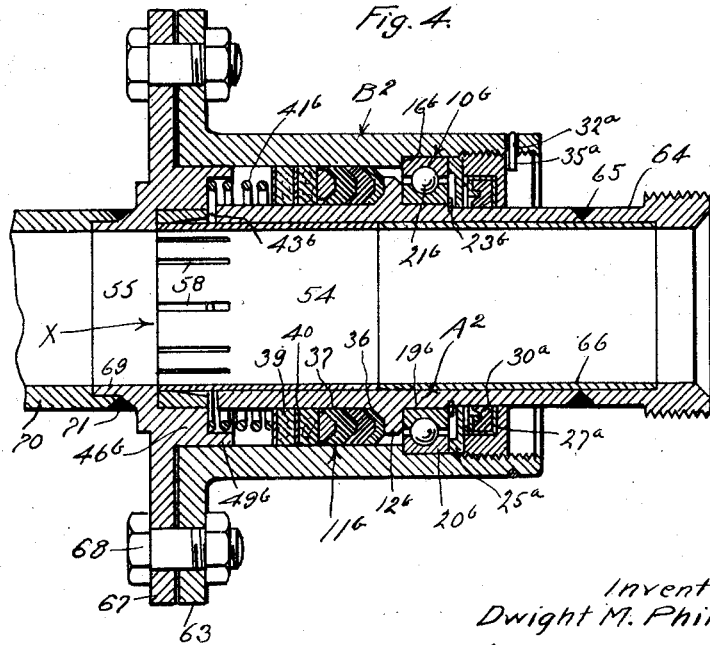
Inventor
Dwight M. Phillips
by
Attorney Patented Aug. 22, 1944

2,356,351

UNITED STATES PATENT OFFICE 2,356,351

SWIVEL CONNECTION

Dwight M. Phillips, Fullerton, Calif., assignor to Chiksan Tool Company, Brea, Calif., a corporation of California Application March 16, 1942, Serial No. 434,877

10 Claims. (Cl. 285—97.3)

This invention relates to swing joints or swivel joints and relates more particularly to fluid conducting swivel joints. A general object of this invention is to provide a practical dependable fluid conducting swivel joint that is compact and very long wearing.

Another object of this invention is to provide a fluid conducting swivel joint particularly well adapted for high speed installations where the speed of relative rotation of the sections is high and the joint embodies a reservoir containing lubricant or other liquid medium for maintaining the parts cool. A substantial body of lubricant, or the like, may be contained in the reservoir to prevent the development of high temperatures as a result of high speed operation.

Another object of this invention is to provide a swivel connection of the character mentioned embodying an effective anti-friction bearing means connecting the sections for free relative rotation and effective long wearing sealing means for sealing between the sections.

Another object of this invention is to provide a fluid conducting swivel joint of the character referred to in which both the bearing means and the sealing means are easily and quickly made accessible for inspection, replacement and repair by merely removing a threaded plug or ring. Upon removing the retaining ring the bearing is immediately accessible for removal from the joint body and upon removal of the bearing the two body sections are separable to allow removal of the sealing means.

Another object of this invention is to provide a swivel joint of the character mentioned embodying a novel bearing retaining means that may be readily installed and locked in the position where the bearing is definitely and securely held in place.

A further object of this invention is to provide a swivel connection of the character referred to that is simple in construction, compact and light in weight, making it particularly adapted for employment on aircraft, vehicles, etc.

The various objects and features of my invention will be fully understood from the following detailed description of typical preferred forms and applications of my invention, throughout which description reference is made to the accompanying drawings, in which:

Fig. 1 is a central longitudinal detailed sectional view of one form of joint of the invention. Fig. 2 is a fragmentary transverse detailed sectional view taken as indicated by line 2—2 on Fig. 1. Fig. 3 is a longitudinal detailed sectional view of another form of the invention. Fig. 3ª is an enlarged fragmentary sectional view of the contact ring and Fig. 4 is a longitudinal detailed sectional view of still another form of the invention.

The embodiment of the invention illustrated in Figs. 1 and 2 of the drawings may be said to comprise, generally, two body sections A and B adapted to be connected with pipe parts or tubes T and T', anti-friction bearing means 10 connecting the sections A and B for free relative rotation, and sealing means 11 for preventing the leakage of fluid from between the sections A and B.

The body sections A and B are adapted to be interposed in a fluid handling line or tube. The section A is the inner section of the joint and is an elongate tubular member of uniform internal diameter. The external surface of the section A is shaped to carry the bearing means 10 and the sealing means 11.

In the preferred construction the section A has an external annular flange 12 spaced between its ends to form an abutment for the bearing means 10 and the sealing means 11. The tubular inner section A is secured on the tube T. In the case illustrated the tube T passes completely through the section A and extends a considerable distance beyond the section.

The section B is the outer part or element of the joint and surrounds the section A with clearance. The section B is an elongate tubular member whose major portion surrounds the section A with a large amount of clearance to provide a space for containing the cooling and lubricating medium and for housing or containing the bearing means 10 and the sealing means 11. An end wall 13 is provided on what may be termed the inner end of the section B. The wall 13 extends radially inward toward the section A but terminates short of the section A. An annular or tubular wall 14 projects longitudinally or axially from the wall 13 and surrounds the section A with substantial clearance leaving a space to receive the sealing means 11, as will be later described. The wall 14 is spaced a substantial distance from the main or outer wall of the tubular section B leaving an annulus or space which forms the reservoir for the cooling and lubricating medium. The wall 14 terminates a short distance from the flange 12 leaving an annular gap which is closed by the sealing means 11, as will be later described. The outer wall of the section B has an annular inturned shoulder 16 lying in the same transverse plane as the outer side of the flange 12 and facing in the same direction as said outer side.

The section B may be associated with the tube T' in any selected or required manner. In the case illustrated the end wall 13 has a counterbore 17 in which a tubing section 18 is secured. The tubing section 18 surrounds the projecting end portion of the tubing T with considerable clearance, leaving an annulus for receiving a shock absorbing means for absorbing pulsations in the fluid line, the shock absorbing means not being shown as it forms no part of the present invention. The tubing T' is suitably secured to the outer end of the section 18.

The anti-friction bearing means 10 serves to connect the sections A and B for free relative rotation. The means 10 comprises a suitable bearing engaged between the sections A and B. This bearing is preferably in the form of a ball bearing comprising an inner race 19, an outer race 20 and a series of balls 21 engaged between the races 19 and 20. In this form of the invention the bearing is designed for high speed operation, that is, it is constructed to connect the sections A and B for relative rotation at high speeds. Retaining rings 22 are set or secured in the outer race 20 and engage with the inner race 19 to seal the interior of the bearing against the entrance of dirt and foreign matter and to prevent the escape of the lubricant with which the bearing is packed. The bearing is in surrounding relation to the section A and is within the section B. The internal surface of the inner race 19 bears on the section A, while the external surface of the outer race 20 fits in the internal surface of the section B. The anti-friction bearing abuts or engages against the flange 12 and the shoulder 16. The inner race 19 bears inwardly against the end face of the flange 12, while the end of the outer race 20 bears against the shoulder 16. Thus, the anti-friction bearing is positively supported against inward axial movement with respect to the two tubular sections A and B. A safety lock ring 23 is provided to prevent outward movement of the bearing 10 when the joint is being taken apart or is partially assembled. The lock ring 23 is a split annular spring ring engaged in an annular groove 24 in the section A and cooperates with the end of the inner bearing race 19.

The invention provides novel and effective means for positively securing the bearing means 10 in the section B that is such that the bearing means and the sealing means 11 may both be made readily accessible for inspection, repair and replacement by simple operations. This means includes an annular nut or ring 23ᵃ threaded in the outer portion of the section B. The inner end of the ring 23ᵃ opposes the anti-friction bearing. The inner end of the ring 23ᵃ is spaced from or outward of the anti-friction bearing. A washer or thrust member 25 is interposed between the inner end of the ring 23ᵃ and the anti-friction bearing. This thrust member is generally L shaped in transverse cross section, being relieved at its inner side to receive the safety ring 23 with substantial clearance. Because of this configuration of the thrust member 25 the member may be entirely clear of and spaced from the inner race 19. It will be seen that the ring 23ᵃ may be threaded inwardly to tightly hold the anti-friction bearing against the flange 12 and the shoulder 16. The thrust member 25 directly bears against the end face of the outer race 20.

It is preferred to provide means on the ring 23ᵃ for sealing with the section A to prevent the inward passage of dirt and other foreign material and to prevent the escape of lubricant from the joint. This sealing means is contained in an inwardly facing counterbore 26. The sealing means or element includes a frame or carrier 27 of metal, or the like, and a sealing part 28 of rubber, synthetic rubber, or the like, contained in the carrier 27. The carrier 27 has an inturned lip 29 at its inner end which maintains an L shaped ring 30 in the carrier 27. The end of the carrier 27 and its lip 29 engage against the thrust member 25. In other words, the thrust member 25 serves to hold the carrier 27 in position within the counterbore 26. The sealing part 28 is shaped to have effective sealing engagement with the section A and is capable of preventing the outward or inward passage of fluid and material. Thus, the anti-friction means 10 is protected against outside dirt which may have a tendency to enter the joint and the lubricant within the joint is prevented from leaking out.

The invention provides novel means for locking or holding the threaded ring 23ᵃ in the position where it holds the thrust member 25 in tight engagement with the bearing race 20 so that the bearing is securely clamped between the member 25 at one end and the shoulder 16 and flange 12 at the other end. This means comprises an annular groove 31 formed in the exterior of the section B adjacent its outer end. A plurality of radial openings 32 pass inwardly through the wall of the section B from the groove 31. The openings 32 are equally spaced throughout the circumference of the section B. A plurality of slots 33 is provided in the end of the nut or ring 23. The slots 33 are likewise equally spaced circumferentially but differ in number from the openings 32. The slots 33 are of substantial circumferential extent. A lock ring or spring ring 34 is arranged around the section B to engage in the groove 31. One end portion of the ring 34 is bent or turned in to be substantially radial and to form a lock lug or finger 35. The finger 35 is passed through one of the openings 32 to engage in one of the slots 33 and thus lock the threaded ring 23 against rotation in the position where the bearing means 10 is securely held in place.

It is a feature of the invention that the width of the slots 33 is related to the number and spacing of the openings 32 so that there is an opening 32 in registration with a slot 33 at any and every rotative position of the threaded ring 23. Thus, in the case where there are nine equally spaced openings 32 in the body section B and four equally spaced slots 33 in the ring 23 the slots are each slightly more than 5° in circumferential extent. In such a case the equal spacing of the nine openings 32 provides that there is always at least one opening 32 in registration with one of the slots 33. It is to be understood that the number of openings 32 and slots 33 may vary in different cases but the relationship is always such that there is at least one opening 32 in registration with a slot 33 with the ring 23 in any rotative position. The importance of the structure just described resides in the fact that the threaded ring 23 may be tightened in against the thrust member 25 so that the bearing is tightly clamped in place and the ring 23 may be dependably locked or set in the position where the bearing is tight. This makes it unnecessary to hand fit the threaded ring 23 to provide for the correct retention of the anti-friction bearing.

The sealing means 11 serves to prevent the leakage of fluid under pressure from between the sections A and B. The sealing means 11 comprises a sealing ring assembly in the space or annulus between the wall 14 and the section A. In the preferred construction the sealing ring assembly includes an inner ring 36 of brass or other selected rigid material arranged against the side surface of the flange 12. The inner ring 36 is of chevron shape and the side of the flange 12 may be correspondingly shaped to provide dependable support for the ring. A plurality of sealing rings 37 is arranged in front of the inner ring 36. The sealing rings 37 are chevron shaped and the innermost sealing ring conforms to and bears against the ring 36. The sealing rings 37 may be formed of any selected sealing material such as synthetic rubber, or the like. The wings or lips of the sealing rings 37 bear and seal against the internal surface of the wall 14 and the periphery of the section A. The rings 37 face outwardly so that they are actuated or expanded by line pressure as will be more fully described. An outer rigid ring 38 engages in the outermost sealing ring 37 and is shaped to conform generally to the sealing ring. One or more sealing washers 39 are arranged in front of the ring 38 to prevent the outward leakage or escape of the cooling and lubricating medium contained in the reservoir 15. The washers 39 are formed of felt, or the like, and maintain effective sealing contact with the periphery of the section A and the inner surface of the wall 14. In the case illustrated there are two washers 39. The inner washer 39 is arranged against the rigid ring 38. Washers 40 of metal, or the like, are arranged at opposite sides of the outermost ring 39, the inner washer 40 being between the two felt washers 39. The rigid rings 40 and the ring 38 serve to prevent excessive distortion of the felt sealing washers 39 and to maintain peripheries of the rings in sealing engagement with the wall 14 and the section A.

The invention provides spring means for maintaining the sealing ring assembly under compression to be effective in sealing between the sections A and B. A spring 41 is arranged under compression between the outermost washer 40 and an internal flange 42 of the section B. The flange 42 may occur at the inner end of the counterbore 17. The spring 41 serves to urge the sealing ring assembly inwardly and holds it in position. Further, the spring 41 assists in actuating or compressing the sealing rings 37 and washers 39.

In accordance with the invention the line pressure, that is, the fluid pressure within the tubes T and T' is utilized to actuate or expand the sealing rings. The flange 42, mentioned above, is spaced from and clear of the section A leaving an annular gap or space 43 which puts the interior of the tube section 18 in communication with the annulus in which the sealing means 11 is disposed. The interior of the section 18 is in communication with the fluid handling line so that the assembly of sealing rings is exposed to the action of the fluid pressure. It will be seen how the fluid pressure from the line acting on the outermost ring of washer 40 exerts an actuating or compressing force on the series of sealing rings 37 and the washers 39.

Where the joint is to be subjected to high speed operation it may be preferred to lubricate the sealing means 11. One or more ports 44 may be formed in the inner ring 36. The ports 44 place the reservoir 15 in communication with the annular space which carries the series of rings 37 and the lubricant or liquid medium contained in the reservoir 15 is delivered to the sealing rings 37 to lubricate the same.

The form of the invention illustrated in Fig. 3 of the drawings comprises, generally, an inner section A', an outer section B', means 10ª connecting the sections for free relative rotation, means 11ª for sealing between the sections A' and B' and means X for maintaining an effective electrical connection between the sections A' and B'.

The section A' may be substantially the same as the above described section A, being an elongate tubular member secured on the tube T. The exterior of the section A' has an annular flange 12ª and the flange is spaced between the ends of the section.

The section B' is an elongate tubular member similar, generally, to the above described section B. The section B' surrounds the section A' with substantial clearance leaving an annulus for receiving the means 10ª, the sealing means 11ª and other elements. The inner end of the section B' has a radial or transverse wall 13ª and a radial flange 45 projects outwardly from the wall 13ª. A tubular or annular wall 14ª projects axially inwardly from the end wall 13ª and is in concentric surrounding relation to the section A'. The wall 14ª surrounds the section A' with substantial clearance leaving an annulus or space for the sealing means 11ª. A head or flange member 46 is provided on the inner end of the section B'. The member 46 has a radial flange 47 which is complementary to the flange 45 and bolts 48 are passed through openings in the flanges 45 and 47 to secure the member 46 to the section B'. The member 46 has a tubular flanged or ribbed boss 49 which fits within the wall 13ª to locate or centralize the member 46. The inner side of the member 46 is spaced from the opposing end of the section A' leaving an annular gap 43ª for the purpose to be later described. The member 46 may be suitably secured to a pipe or tube part L. In the case illustrated the member 46 has a tubular hub or boss 50 received in the end portion of the tubular part L and welding, brazing or soldering 51 secures the member 46 to the tube part L and maintains a seal.

The above mentioned tubular wall 14ª of the section B' is spaced a considerable distance inwardly from the outer wall of the section B' leaving an annular space or reservoir 15ª for the cooling medium. The wall 14ª terminates short of the transverse plane occupied by the flange 12ª. An internal outwardly facing annular shoulder 16ª is provided on the main or body wall of the section B'. The shoulder 16ª is in or adjacent the plane occupied by the flange 12ª and is spaced forwardly from the annular wall 14ª.

The anti-friction means 10ª for connecting the sections A' and B' for free relative rotation may be substantially the same as the means 10 described above. The means 10ª comprises an anti-friction bearing made up of an inner race 19ª, an outer race 20ª and a row of balls 21ª engaged between the races. The inner race 19ª fits on the section A', while the outer race 20ª fits within a bearing retainer 52. The bearing retainer 52 in turn fits within the wall of the section B' and its end bears against the shoulder 16ᵃ. The retainer 52 is L shaped in transverse cross section to effectively support and retain the bearing. A safety lock ring 23ᵃ is sprung into an annular groove in the section A' and engages with the outer end of the inner bearing race 19ᵃ to hold the bearing in place.

The means for clamping or securing the antifriction bearing means 10ᵃ in position may be the same as in the previously described form of the invention, comprising a thrust member 25ᵃ for bearing against the outer race 20ᵃ and the retainer 52, a nut or ring 23ᶜ threaded in the outer portion of the section B' and clamping against the member 25ᵃ and the lock ring 34ᵃ arranged in the groove 31ᵃ and having a finger 35ᵃ passing through one of the opening 32ᵃ and engaging in one of the notches 33ᵃ. The nut or ring 23ᶜ supports the sealing ring 30ᵃ which is contained by the retainer 27ᵃ, all as above described.

The sealing means 11ᵃ may be the same as in the preceding form of the invention. The sealing means 11ᵃ is contained in the annular space between the wall 14ᵃ and the section A' and comprises the inner ring 36, the plurality of sealing rings 37, the outer rigid ring 38, the felt washers 39 and the metal washers 40. A spring 41 is arranged under compression between the inner side of the member 46 and the outer washer 40 to hold the sealing assembly and to actuate the sealing rings 37 and to compress the felt washers 39. The sealing assembly is expanded or actuated by line pressure admitted into the section B' by the gap 43ᵃ. The means 11ᵃ operates as in the preceding form of the invention, the sealing rings 37 being effective in preventing the outward leakage of fluid under pressure from between the sections A' and B' and the washers 39 being effective in preventing the inward leakage of the lubricant or cooling fluid. The inner ring 36 has one or more ports 44 for admitting the lubricant or cooling fluid to the rings 37 to lubricate the same. The fluid admitted by the ports 44 effectively lubricates the sealing rings 37. The felt washers 39 prevent the leakage or escape of this lubricating fluid into the line.

The means X operates to maintain a continuous and adequate electrical connection between the relatively rotatable sections A' and B'. The means X includes a tube 54 of suitable conductive material such as brass, copper, or the like, secured within the section A' to project from its inner end. The tube 54 may be force fitted or otherwise secured in the section A' and may directly abut against the end of the tube T. The means X further includes a contact ring 55 of steel or other conductive material fixed in the member 46. The ring 55 may be suitably secured in a counterbore in the inner side of the member 46 to directly oppose the end of the section A'. The portion of the tube 54 which projects from the section A' extends into the contact ring 55. The tube 54 and contact ring 55 are constructed to assure an effective and adequate engagement. The interior of the ring 55 may have a flaring or conical surface 56. The surface 56, in most cases, does not extend throughout the full length of the ring 55 and leaves a cylindrical surface 57 to be engaged by the tube 54. The longitudinal extent of this surface 57 is determined by the extent of the conical surface 56. The extent of engagement between the contact ring 55 and the tube 54 may be varied by increasing or decreasing the length of the conical surface 56.

The projecting end portion of the tube 54 has circumferential spaced longitudinal slots 58 providing a multiplicity of resilient fingers. Prior to the assembling of the joint these fingers are flaring and when the joint is assembled the resiliency of the fingers holds their outer surfaces in contact with the cylindrical surface 57 of the contact ring 55. Thus, a continuous adequate electrical connection is maintained between the sections A' and B'. The slots 58 communicate with the gap 43ᵃ so that the annulus between the wall 14ᵃ and the outer wall of the section B' is maintained in continuous communication with the line so that the line pressure is maintained on the sealing means 11ᵃ.

Means may be provided for facilitating the provision or filling of the cooling and lubricating fluid in the reservoir 15ᵃ. A longitudinal port 59 may be formed in the end wall 13ᵃ of the section B' and a registering port 60 may be formed in the flange 47. A threaded plug 61 normally closes the port 59.

The joints illustrated in Figs. 1, 2, 3 and 3ᵃ are adapted for high speed rotation and the lubricant contained in the reservoir 15 or 15ᵃ serves to maintain the parts cool. The cooling and lubricating fluid also lubricates the sealing means 11 and 11ᵃ and, if desired, may lubricate the anti-friction means 10 or 10ᵃ. The anti-friction means 10 and 10ᵃ connect the sections for rotation with a minimum of friction and are sturdy and long wearing. The bearing means is readily made accessible for repair or replacement by removing the threaded ring 23ᶜ and following this the sealing means 11 and 11ᵃ may be made accessible for inspection, repair and replacement by relative longitudinal movement between the sections A and B. In the case of the structure illustrated in Fig. 3 it may be desired to detach the member 46 from the section B' to make the sealing means 11ᵃ accessible for repair and replacement.

The joint illustrated in Fig. 4 comprises, generally, a section A², a section B², anti-friction bearing means 10ᵇ connecting the sections A² and B² for free relative rotation, sealing means 11ᵇ for sealing between the sections A² and B² and the means X for maintaining an electrical connection between the sections.

The section A² is an elongate tubular member and may be of uniform internal diameter throughout its length. An annular radial flange 12ᵇ may be provided on the exterior of the section A² at a point between the ends of the section. A coupling part 64 may be provided on the outer end of the section A². In the case illustrated this part 64 carries an external thread for engagement with a pipe coupling, union, or the like, and is secured to the end of the section A² by welding, soldering or brazing 65. When the part 64 is secured to the section A² in this manner it is preferred to provide a tube 66 within the opposing end portions of the section A² and the part 64 to maintain accurate alignment, a uniform internal diameter and a complete electrical connection.

The section B² is an elongated tubular member which surrounds the section A² with substantial clearance to leave an annulus which receives the means 10ᵇ and 11ᵇ. An annular radially projecting flange 63 is provided on what I will term the inner end of the section B². The interior of the section B² is generally uniform in diameter except for an annular shoulder 16ᵇ which faces toward the outer end of the section. A member 46ᵇ is secured to the flanged inner end of the section B². This member 46ᵇ has a flange 67 mating with the flange 63 and screws or bolts 68 are passed through registering openings in the flanges 63 and 67 to secure the member 46ᵇ to the section B². The hub portion of the member 46ᵇ fits within the section B² and has a flange 49ᵇ continuing into the section. The member 46ᵇ is formed for connection with a pipe part. In the case illustrated the member 46ᵇ has a reduced portion 69 which is received in a pipe part 70 and which is welded, soldered or brazed to the body at 71. The inner side of the member 46ᵇ is spaced from the opposing end of the section A² leaving an annular gap 43ᵇ for the purpose to be later described.

The means 10ᵇ comprises an anti-friction bearing made up of an inner race 19ᵇ, an outer race 20ᵇ and a series of balls 21ᵇ engaged between the races. The bearing surrounds the section A² within the section B², the inner race 19ᵇ directly engaging around the section A² and the outer race 20ᵇ directly engaging in the section B². The inner race 19ᵇ bears against the flange 12ᵇ of the section A², while the outer race 20ᵇ bears against the shoulder 16ᵇ of the section B². A safety lock ring 23ᵇ is seated in a groove in the section A² and engages against the outer end of the race 19ᵇ to hold the bearing against outward displacement.

The bearing just described may be held or secured in position by the same means as employed in the previously described forms of the invention and corresponding reference numerals are applied to the corresponding elements of this means. It will be observed that the thrust member 25 urged inwardly by the ring 23 tightly clamps the bearing against the flange 12ᵇ and the shoulder 16ᵇ.

In the form of the invention illustrated in Fig. 4 the sealing means 11ᵇ seals directly between the external surface of the section A² and the internal surface of the section B². The means 11ᵇ may comprise the sealing ring assembly described above which includes the inner metal ring 36, the sealing rings 37 of synthetic rubber, or the like, the outer rigid ring 38, the felt washers 39 and the metal washers 40. The wings or lips of the sealing rings 37 seal with the external surface of the section A² and the internal surface of the section B² and the felt washers 39 likewise seal between the surfaces to prevent the outward leakage of lubricant, etc. The sealing ring assembly is actuated by the line pressure admitted to the interior of the section B² through the gap 43ᵇ and the spring 41ᵇ assists in compressing or actuating the sealing ring assembly and holds the assembly in place. The spring 41ᵇ is engaged between the inner side of the member 46ᵇ and the outermost washer 40 and is centered by the flange 49ᵇ of the member.

The means X may be the same as in Fig. 3 comprising a contact tube 54 in the section A² and a contact ring 55 in the member 46ᵇ. The tube 54 is force fitted or otherwise secured in the section A² and its inner end contacts the end of the tube 66. The projecting portion of the tube 54 has the spaced slots 58 leaving resilient fingers which bear on the cylindrical surface 57 of the contact ring 55. The ring 55 is fixed in the inner side of the member 46ᵇ. The slots 58 communicate with the gap 43ᵇ so that fluid pressure from the line is admitted to the interior of the section B² to actuate the sealing means 11ᵇ.

Having described typical preferred forms and applications of my invention, I do not wish to be limited or restricted to the specific details herein set forth, but wish to reserve to myself any variations or modifications that may appear to those skilled in the art or fall within the scope of the following claims.

Having described my invention, I claim:

1. A swivel joint to be connected between fluid handling parts comprising a tubular outer section to be connected with one of said parts and having an internal shoulder, a tubular inner section to be connected with the other of said parts and extending into the outer section, an external flange on the inner section, an anti-friction bearing engaged between the sections and having one end engaging against said shoulder and one side of the flange, a ring removably threaded in the outer section and clamping the bearing inwardly against said shoulder and said side of the flange so that the bearing connects the sections for relative rotation and prevents relative axial movement between the sections, sealing means at the other side of said flange, and means for directing fluid pressure against the sealing means to actuate the same and to compress the sealing means against said other side of the flange.

2. A swivel joint to be connected between fluid handling parts comprising a tubular outer section to be connected with one of said parts and having an internal shoulder, a tubular inner section to be connected with the other of said parts and extending into the outer section, an external flange on the inner section, an anti-friction bearing engaged between the sections and having one end engaging against said shoulder and one side of the flange, a ring removably threaded in the outer section and clamping the bearing inwardly against said shoulder and said side of the flange so that the bearing connects the sections for relative rotation and prevents relative axial movement between the sections, sealing means engaged against the other side of said flange, spring means for holding the sealing means against said other side of the flange, and means for directing fluid pressure against the sealing means to actuate the same.

3. A swivel joint to be connected between fluid handling parts comprising a tubular outer section to be connected with one of said parts and having an internal shoulder, a tubular inner section to be connected with the other of said parts and extending into the outer section, an external flange on the inner section, an antifriction bearing engaged between the sections and having one end engaging the shoulder and one side of the flange, a ring removably threaded in the outer section and clamping the bearing inwardly against said shoulder and said side of the flange so that the bearing connects the sections for relative rotation and prevents relative axial movement between the sections, a tubular axial wall projecting inwardly from an end of the outer section toward said flange and spaced radially inward from the main circumferential wall of the outer section to leave a reservoir for cooling medium, and spaced radially outward from the inner section, and sealing means between the axial wall and the inner section and bearing against the other side of said flange to seal between the sections.

4. A swivel joint to be connected between fluid handling parts comprising a tubular outer section to be connected with one of said parts and having an internal shoulder, a tubular inner section to be connected with the other of said parts and extending into the outer section, an external flange on the inner section, an anti-friction bearing engaged between the sections, a ring removably threaded in the outer section and clamping the bearing inwardly against said shoulder and one side of the flange so that the bearing connects the sections for relative rotation and prevents relative axial movement between the sections, a tubular axial wall projecting inwardly from an end of the outer section toward said flange and spaced radially inward from the main circumferential wall of the outer section to leave a reservoir for cooling medium, and spaced radially outward from the inner section, and sealing means between the axial tubular wall and the inner section and bearing against the other side of said flange to seal between the sections, there being a space between said tubular axial wall and said flange whereby the sealing means is exposed to and lubricated by said medium.

5. A swivel joint to be connected between fluid handling parts comprising a tubular outer section to be connected with one of said parts and having an internal shoulder, a tubular inner section to be connected with the other of said parts and extending into the outer section, the inner section having an external shoulder, an anti-friction bearing between said sections, a ring threaded in one end of the outer section and clamping the bearing against said shoulders so that the bearing connects the sections for relative rotation, an axial tubular wall projecting inwardly from the other end of the outer section in spaced surrounding relation to the inner section, and sealing means between said wall and the inner section for preventing the leakage of fluid from between the sections.

6. A swivel joint to be connected between fluid handling parts comprising a tubular outer section to be connected with one of said parts and having an internal shoulder, a tubular inner section to be connected with the other of said parts and extending into the outer section, the inner section having an external shoulder, an anti-friction bearing between said sections, a ring threaded in one end of the outer section and clamping the bearing against said shoulders so that the bearing connects the sections for relative rotation, an axial tubular wall projecting inwardly from the other end of the outer section in spaced surrounding relation to the inner section, and sealing means between said wall and the inner section for preventing the leakage of fluid from between the sections, said axial wall being spaced radially inward from the main circumferential wall of the outer section to leave a reservoir space for cooling medium.

7. A swivel joint to be connected between fluid handling parts comprising a tubular outer section to be connected with one of said parts and having an internal shoulder, a tubular inner section to be connected with the other of said parts and extending into the outer section, the inner section having an external shoulder, an anti-friction bearing between said sections, a ring threaded in one end of the outer section and clamping the bearing against said shoulders so that the bearing connects the sections for relative rotation, an end member removably secured to the other end of the outer section and having a tubular axial wall projecting into the outer section in spaced relation to the circumferential wall of the outer section leaving a reservoir space for cooling medium, and sealing means sealing between said axial wall and the inner section to prevent leakage from between the sections.

8. A swivel joint to be connected between fluid handling parts comprising a tubular outer section to be connected with one of said parts and having an internal shoulder, a tubular inner section to be connected with the other of said parts and extending into the outer section, the inner section having an external shoulder, an anti-friction bearing between said sections, a ring threaded in one end of the outer section and clamping the bearing against said shoulders so that the bearing connects the sections for relative rotation, an end member removably secured to the other end of the outer section and having a tubular axial wall projecting into the outer section in spaced relation to the circumferential wall of the outer section leaving a reservoir space for cooling medium, and sealing means sealing between said axial wall and the inner section to prevent leakage from between the sections, there being a gap between said member and the adjacent end of the inner section so that fluid pressure is admitted to the interior of said wall to actuate the sealing means.

9. A swivel joint to be connected between fluid handling parts comprising a tubular outer section to be connected with one of said parts and having an internal shoulder, a tubular inner section to be connected with the other of said parts and extending into the outer section, the inner section having an external shoulder, an anti-friction bearing between said sections, a ring threaded in one end of the outer section and clamping the bearing against said shoulders so that the bearing connects the sections for relative rotation, an end member removably secured to the other end of the outer section, and sealing means for sealing between the sections accessible upon removal of said member.

10. A swivel joint to be connected between fluid handling parts comprising a tubular outer section to be connected with one of said parts and having an internal shoulder, a tubular inner section to be connected with the other of said parts and extending into the outer section, the inner section having an external shoulder, an anti-friction bearing between said sections, a ring threaded in one end of the outer section and clamping the bearing against said shoulders so that the bearing connects the sections for relative rotation, an end member removably secured to the other end of the outer section, and sealing means for sealing between the sections accessible upon removal of said member, said member being spaced from the adjacent end of the inner section leaving a gap so that fluid pressure may actuate the sealing means.

DWIGHT M. PHILLIPS.